United States Patent
Dotz

(10) Patent No.: US 11,489,389 B2
(45) Date of Patent: Nov. 1, 2022

(54) STATOR WITH PINS FOR AN ELECTRIC MACHINE

(71) Applicant: VALEO SIEMENS EAUTOMOTIVE GERMANY GMBH, Erlangen (DE)

(72) Inventor: Boris Dotz, Munich (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 191 days.

(21) Appl. No.: 17/113,740

(22) Filed: Dec. 7, 2020

(65) Prior Publication Data

US 2021/0175765 A1   Jun. 10, 2021

(30) Foreign Application Priority Data

Dec. 9, 2019   (DE) .................... 10 2019 133 549.3

(51) Int. Cl.
   *H02K 3/28*      (2006.01)
   *H02K 3/12*      (2006.01)
   *H02K 3/50*      (2006.01)

(52) U.S. Cl.
   CPC ............. *H02K 3/28* (2013.01); *H02K 3/12* (2013.01); *H02K 3/505* (2013.01)

(58) Field of Classification Search
   CPC .. H02K 3/00; H02K 3/12; H02K 3/28; H02K 3/50; H02K 3/505
   See application file for complete search history.

(56) References Cited

U.S. PATENT DOCUMENTS

| 6,894,417 | B2 * | 5/2005 | Cai .......................... H02K 3/28 310/201 |
| 7,242,124 | B2 | 7/2007 | Ogawa et al. |
| 9,136,738 | B2 | 9/2015 | Ikeda et al. |
| 10,461,591 | B2 | 10/2019 | Sakaue et al. |
| 2012/0161569 | A1 | 6/2012 | Hisada |
| 2014/0319953 | A1 * | 10/2014 | Rahman ................... H02K 3/04 310/201 |
| 2021/0184527 | A1 * | 6/2021 | Dotz ........................ H02K 3/28 |

FOREIGN PATENT DOCUMENTS

DE         10326095 A1    4/2004
DE      112013003398 T5   4/2015

* cited by examiner

*Primary Examiner* — Tran N Nguyen
(74) *Attorney, Agent, or Firm* — Manabu Kanesaka

(57) ABSTRACT

A stator for an electric machine includes a plurality of pins, which are arranged on concentric circles at different distances to a stator center in slots in the stator, and each concentric circle forms a layer. In each case four pins in different layers are serially connected to one another and form a winding, a first pin of the winding is located in a first slot in the 4n–3 layer, wherein n is an integer, a second pin of the winding is located in a second slot in the 4n–2 layer, wherein the second slot has a first radial distance to the first slot in a first circumferential direction of the stator, a third pin of the winding is located in the first slot in the 4n layer, and a fourth pin of the winding is located in the second slot in the 4n–1 layer.

10 Claims, 14 Drawing Sheets

STATOR WITH PINS FOR AN ELECTRIC MACHINE

RELATED APPLICATIONS

The present application is based on, and claims priority from, German Application No. DE 10 2019 133 549.3 filed Dec. 9, 2019, the disclosure of which is hereby incorporated by reference herein in its entirety.

The invention relates to a stator with pins for an electric machine, in particular an electric motor.

BACKGROUND INFORMATION

Electric machines are generally known and are increasingly used as electric motors for driving vehicles. An electric machine consists of a stator and a rotor.

The stator comprises a plurality of slots, in which the windings are guided. The windings may be formed from insulated copper rods as so-called pins. The rotor is located in the stator and is connected to a rotor shaft.

Such a pin, U pin, or hairpin motor is known, for example, from U.S. Pat. No. 9,136,738 B2.

BRIEF DESCRIPTION OF THE INVENTION

The object of the present invention is to provide a stator with windings made from pins, which is easy to manufacture.

According to the invention a stator for an electric machine comprises a plurality of pins, which are arranged on concentric circles at different distances to a stator center in slots in the stator, and each concentric circle forms a layer, wherein in each case four pins in different layers are serially connected to one another and form a winding, a first pin of the winding is located in a first slot in the $4n-3$ layer, wherein n is an integer, a second pin of the winding is located in a second slot in the $4n-2$ layer, wherein the second slot has a first radial distance to the first slot in a first circumferential direction of the stator, a third pin of the winding is located in the first slot in the $4n$ layer, a fourth pin of the winding is located in the second slot in the $4n-1$ layer, wherein the fourth slot lies adjacent to the second slot.

The layers may be numbered in ascending order from the outside inward to the stator center. The integers do not include zero.

A stator with the winding according to the invention may be easily produced and generates an efficient electromagnetic field with lower iron or magnetic losses, and a better utilization of the steel sheet stacks. The connection types establish an electrically conductive connection between the pins in the slots. The connection type may be a welding of conductors to the pins, or the pins may already be designed as double pins, so-called U pins, and thus already establish a connection upon insertion into the stator. Furthermore, a bonding of end sections of the pins bent toward one another also represents a connection type.

The stator may preferably have a first and a second end face, and the first and second pins may be connected to one another on the second end face by means of a first connection type, the second pin and third pin may be connected to one another on the first end face by means of a second connection type, the third pin and fourth pin may be connected to one another on the second end face by means of a third connection type, wherein the first, second, and third connection types differ from one another.

The different connection types enable an improved manufacturing. An alternating location of the connection types on different end faces enables the efficient formation of a winding about the stator teeth lying between the slots. The different connection types enable an improved manufacturing.

Even connection types on the same end face of the stator may differ due to different bending directions of a pin foot toward the stator interior or exterior.

A combination of the previously listed connection types on different or the same end faces of the stator is also possible. A simple and fast manufacturing is possible due to one same connection type on the same end faces, and different connection types on different end faces of the stator. For example, the connection is established by a type of pre-bent pins, so-called double pins or also U pins on one end face, and pins are welded to one another individually or one side of the double pin in each case is welded on another end face of the stator. The weld spots may contact the feet of the pins or double pins.

The pin at the beginning of a winding may preferably be a first end pin, wherein the first end pin is configured as a single pin. A single pin is, for example, an I pin.

In one embodiment of the invention, the stator may have at least two windings, and at least the fourth pin in the second slot is connected to a fifth pin in the $4n-3$ layer in a third slot by means of a fourth connection type.

The rotating field generated by such a winding has fewer disturbing harmonics and thus has fewer torque ripples and smaller torque fluctuations, and also better NVH properties.

A second distance, which is larger than the first distance, may preferably lie between the second slot and the third slot.

A stator with windings, which are distributed on slots with different distances, has lower AC ohmic losses and a lower saturation.

In another embodiment of the invention, the stator may have a plurality of windings, which extend across the entire circumference of the stator and thereby form a partial coil.

The windings thus have a symmetry which generates a uniform rotating field.

One pin in each case from two partial coils may additionally preferably be connected to one another by means of a fifth connection type or a sixth connection type and form a coil. These pins may be so-called end pins, which mark the end of a partial coil.

In one embodiment of the invention, the end pins at the beginning or end of a coil may be configured as single pins.

Four pins of one coil may preferably completely occupy four slots.

The partial coils may additionally preferably form six coils, and these may be assigned to three phases in such a way that in each case, two coils, which are assigned to a same phase, may be located in three adjacent slots and thereby in each case two different layers of the two outer slots are occupied by pins from other phases.

In one preferred embodiment of the invention, one input and output in each case of the at least two coils may be connected to one another, and the two coils may thus be switched in parallel and may, in particular, be assigned to one phase.

One input from at least two coils may additionally preferably be connected to one another by means of a seventh connection type.

The seventh connection type may be established by a conductor applied to the pins or by a conducting ring.

The two coils may be connected in parallel and may additionally be supplied by a same phase. The parallel connection may be carried out by the paired connection of a first and fifth end pin or of a fourth and eighth end pin.

Furthermore, two phases may respectively have an approximately identical current and voltage curve, and thus a six-phase inverter may only control a three-phase motor. A current division of the switching elements is possible in the inverter using this arrangement.

Two coils in three adjacent slots may thus be switched in parallel and supplied by one phase, so that a stator results with windings for a three-phase electric machine.

According to the invention, a vehicle has an electric machine with a stator according to one of the preferred embodiments.

DESCRIPTION OF THE DRAWINGS

FIG. 1 shows a stator 1 with a plurality of slots 5 in which pins 2, 3 are guided. Stator 1 has a first end face 7 and a second end face 9 lying opposite. Inputs 81, 87, 101, 107, 111, 117 and outputs 83, 85, 103, 105, 113, 115 of partial coils for connecting the pins to an energy source for operating the electric machine are shown on first end face 7. Naturally, a rotor is additionally necessary to operate an electric machine. The pins for the connection lie closely adjacent and enable short connecting lines.

FIG. 2 shows a stator 1 with slots and pins on four layers, wherein only eight slots 51, 52, 53, 54, 55, 56, 57, 58 are depicted. Pins 21, 23 are arranged in slots 51, 52, 53, 54, 55, 56, 57, 58. Pins 21, 23 lie adjacent to one another in one slot. In the example from FIG. 2, four pins lie adjacent to one another in one slot. The four pins within one slot thus lie on different concentric circles L1, L2, L3, L4 around center M of the stator, which thus form individual layers. A standard distance 11 lies between each two slots. This standard distance 11 is identical between all slots shown in FIG. 2.

FIG. 3 shows stator 1 from FIG. 2. The pins are, moreover, arranged on concentric circles, thus layers, wherein the concentric circles are not marked for the sake of a better depiction. FIG. 3 depicts which pins are serially connected to one another. A pin 21, which is also simultaneously an end pin and has an input 81, is located in a slot 51 in layer L4. This first end pin is, for example, a single pin, which is configured as an I pin.

Pin 21 is connected to a pin 27 in a slot 92 by means of a third connection type 63, depicted as a solid line. Pin 27 is located in layer L3. Pin 22 is connected to a first pin 25 in a first slot 53 by means of a fourth connection type 64, depicted as a short dashed line. First pin 25 lies in layer L1.

Figure 1:
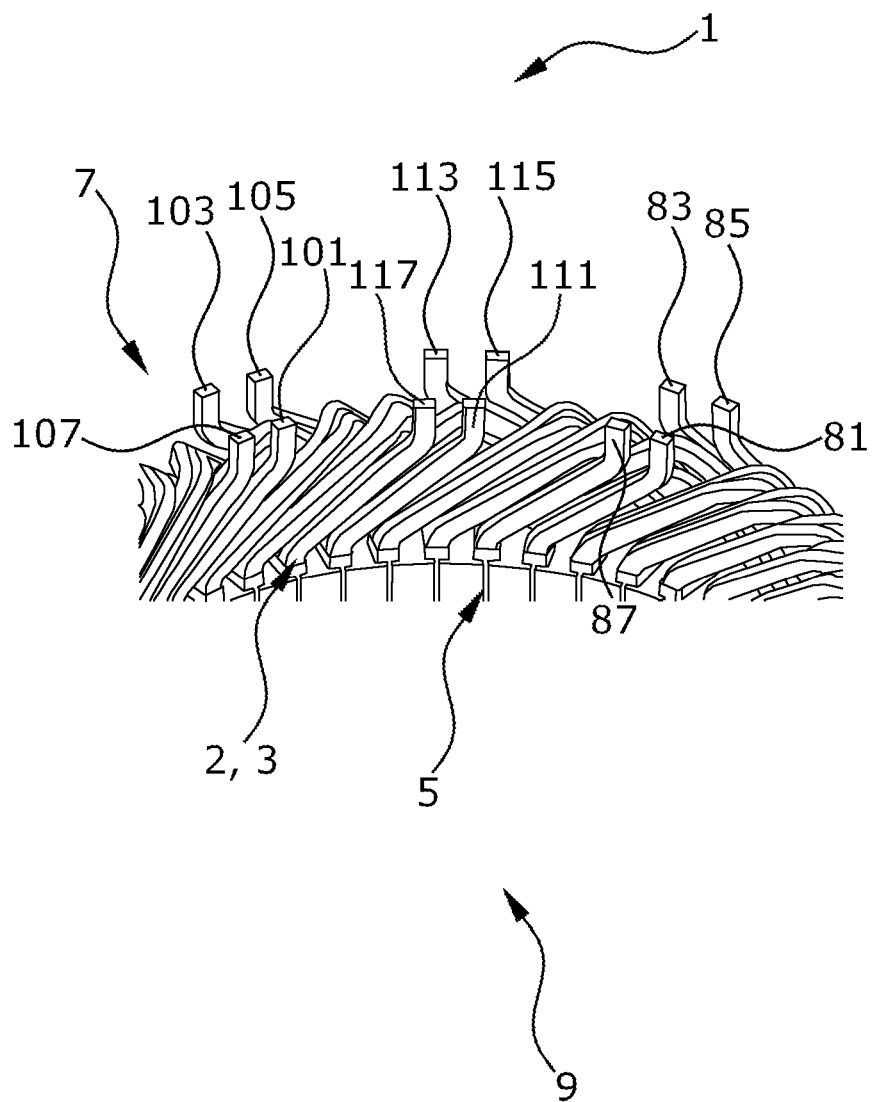
FIG. 1 shows a stator.
Figure 2:
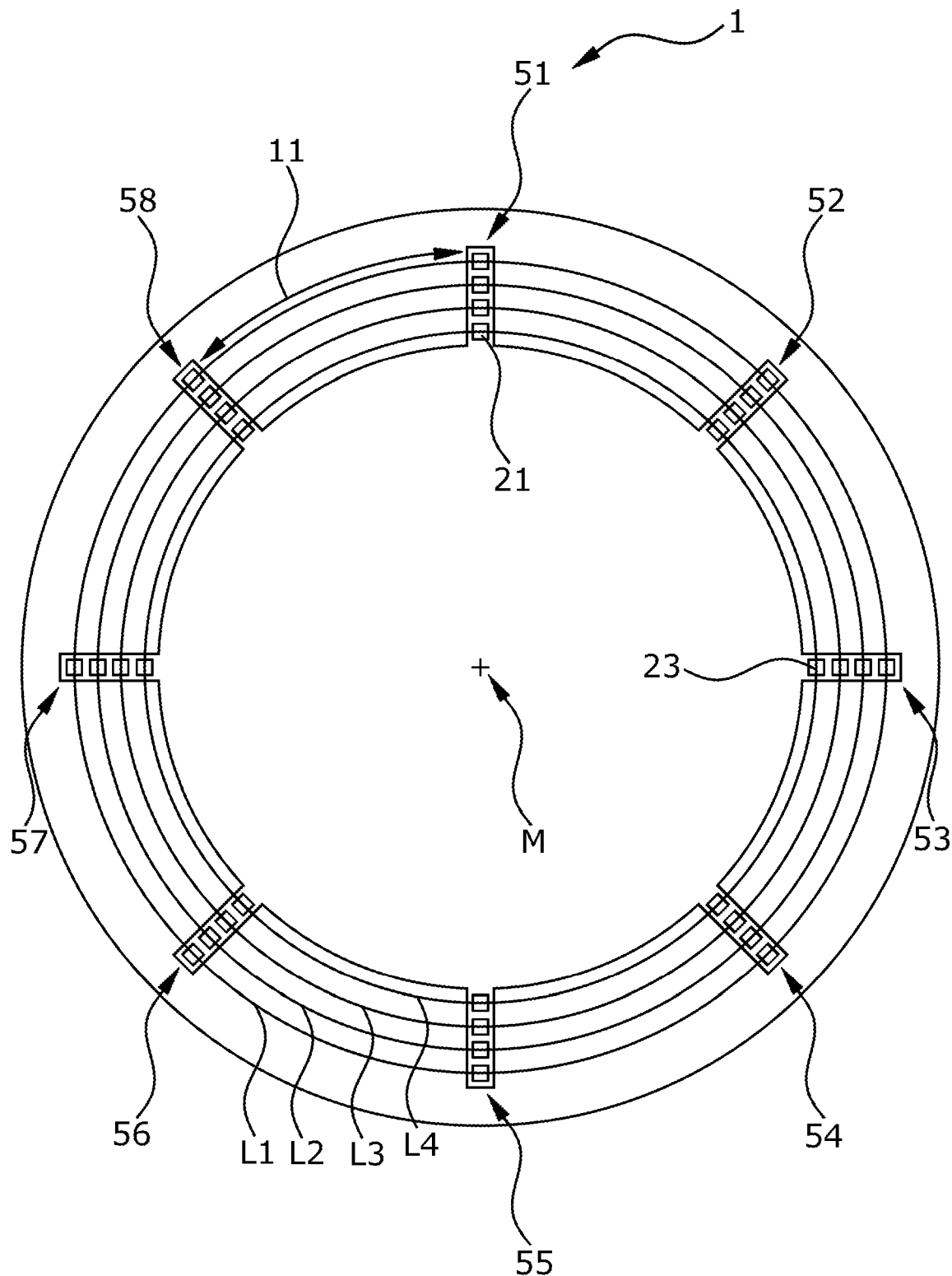
FIG. 2 shows a stator with eight slots and four layers.

First pin 25 is connected to a second pin 24 via a first connection type 61, depicted as a dotted line. Second pin 24 lies in a second slot 94. A first distance 13, which is one slot shorter than standard distance 11 from FIG. 2, lies between first slot 53 and second slot 94. Second pin 24 lies in layer L2.

Second pin 24 is connected to a third pin 23 in first slot 53 by means of a second connection type 62, depicted as a dashed line. Third pin 23 lies in layer L4. There is thus still space in first slot 53 for two other pins between first pin 25 and third pin 23.

Third pin 23 is connected to a fourth pin 22 in second slot 94 by means of a third connection type 63, depicted as a solid line. Fourth pin 22 lies in layer L3. Second pin 24 and fourth pin 22 lie in the center of the slot, so that there is still space for two other pins on stator inner layer L4 and on stator outer layer L1.

The connection of the first, second, third, and fourth pins forms a first winding 41.

Fourth pin 22 is connected to a fifth pin 26 in a third slot 55 via fourth connection type 64. A second distance 19, which is one slot shorter than standard distance 11, lies between second slot 94 and third slot 55. Fifth pin 26 lies in layer L1. At fifth pin 26, the previously-described serial connection of the consecutive pins in the stator begins again, wherein fifth pin 26 is similar to first pin 25 with an offset of the slot by 90 degrees.

The serial connection of fifth pin 26 to other pins in another slot 96 forms a second winding 42. First, second, and third connection types 61, 62, 63 between these pins is identical to the respective first, second, and third connection types 61, 62, 63 of the pins of the first winding 41.

The two windings 41, 42 are connected by fourth connection type 64. Due to the continuation of the serial connection, a third winding 43 is formed in two other slots 57 and 98. Windings 41, 42, 43 are each connected using fourth connection type 64. Fourth connection type 64 between the respective windings is thus identical. First, second, and third connection types 61, 62, 63 between the pins of windings 43 are also identical to the first, second, and third connection types 61, 62, 63 of the first and second windings 41, 42.

Fourth winding 44 is also connected to third winding 43 via fourth connection type 64; however, this winding lacks a connection of the second connection type. Pin 28 represents a second end pin and winding 44 arises according to FIG. 5 and is described there.

Four windings 41, 42, 43, 44 form a first partial coil by way of one circuit clockwise about stator 1. First pin 21 has an input 81 for connecting to an energy source. The partial coil ends with second end pin 28 of winding 44.

Figure 4:
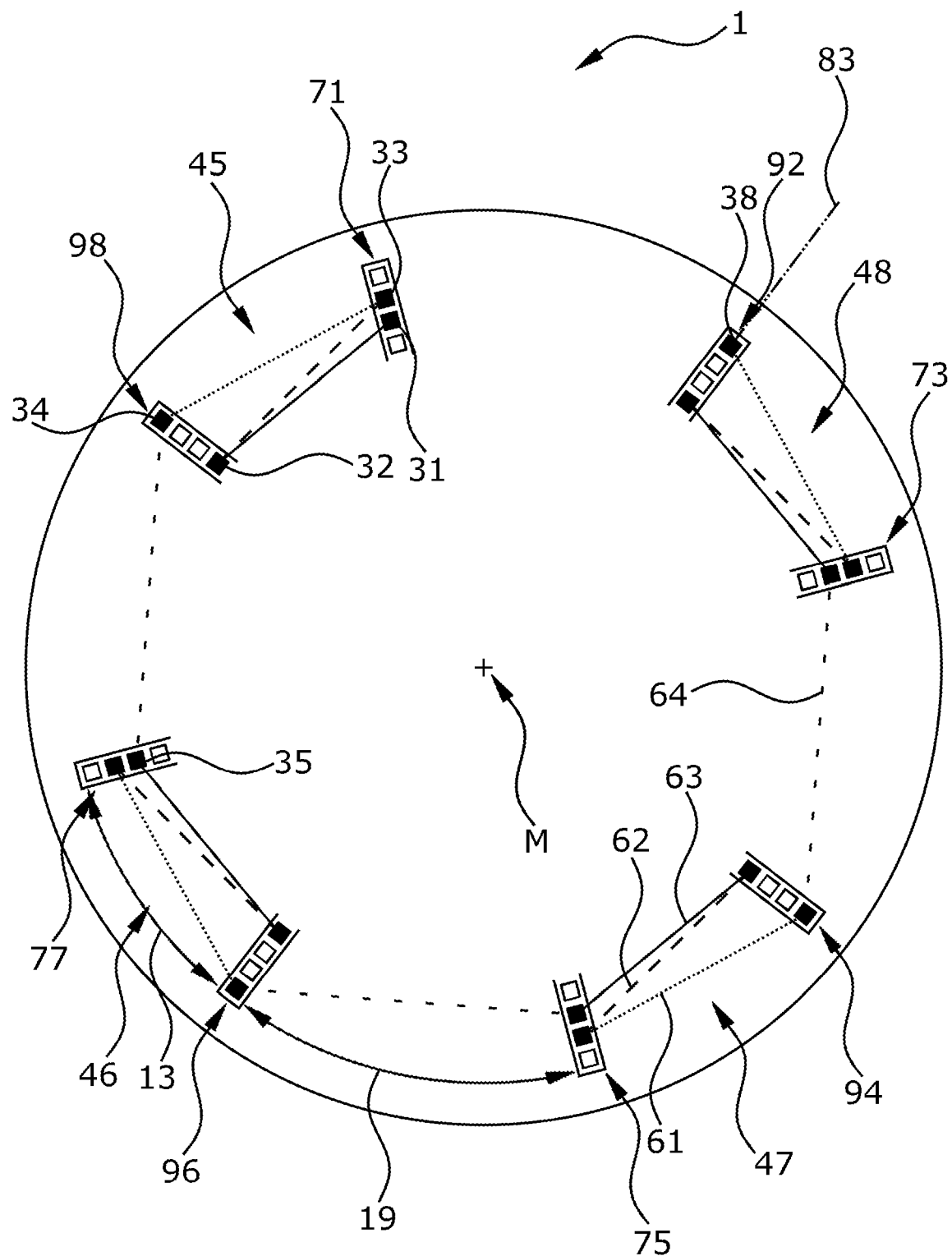
FIG. 4 shows a winding scheme of a second partial coil.

FIG. 4 shows a stator 1, wherein eight slots 71, 73, 75, 77, 92, 94, 96, 98 are shown.

Figure 3:
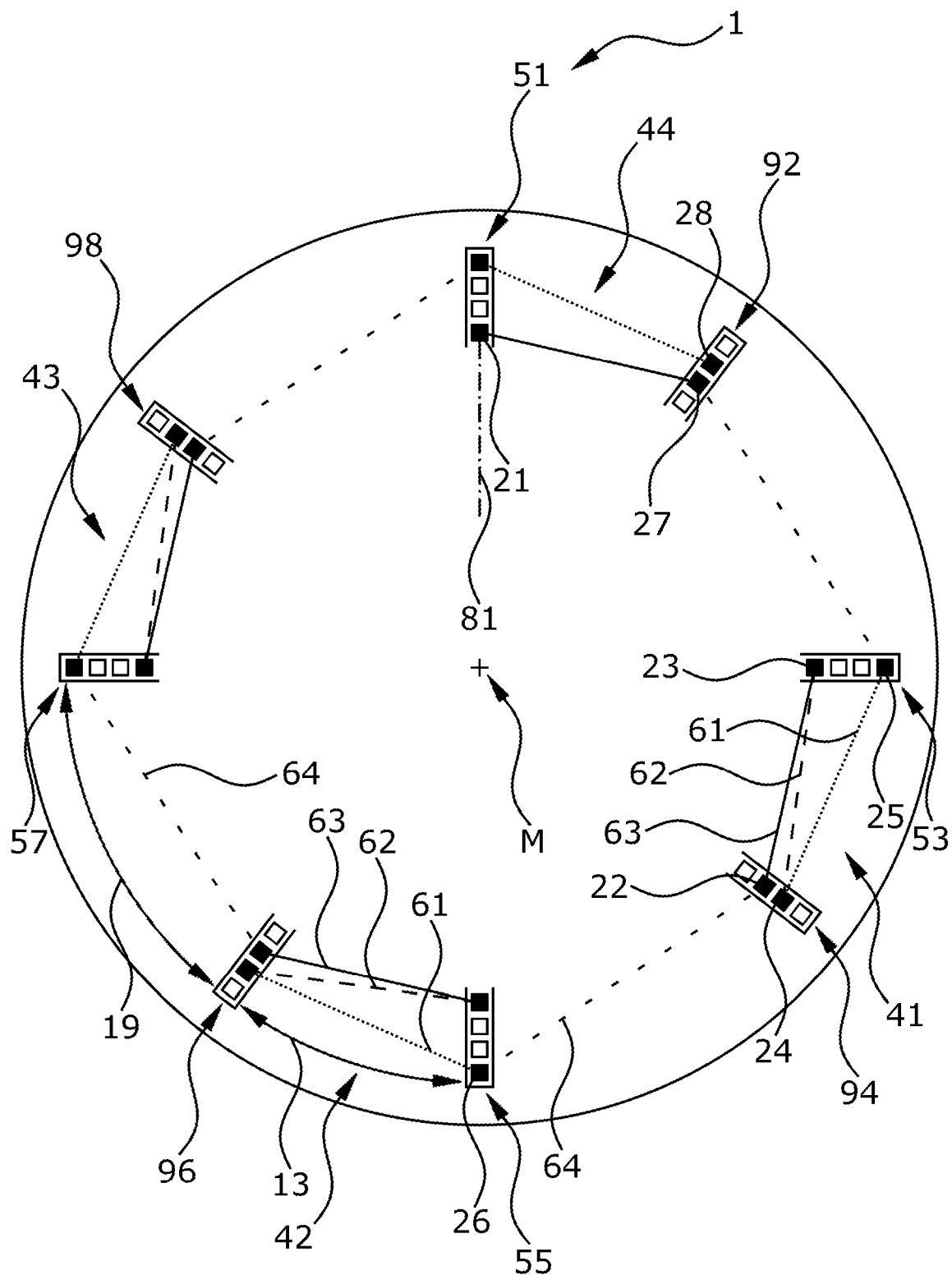
FIG. 3 shows a winding scheme of a first partial coil.

Pins 31, 32, 33, 34, 35, 38 are connected in the same way as pins 22, 23, 24, 25, 26, 28 of FIG. 3. Even the connection types are identical with FIG. 3 and are clearly expressed by identical reference numerals. Windings 45, 46, 47, 48 are formed in the same way as is described in FIG. 3, and connected to one another by fourth connection type 64.

Four windings 45, 46, 47, 48 form a second partial coil by way of one circuit counterclockwise about stator 1. The partial coil begins with a pin 31, which is a third end pin. The partial coil ends with pin 38 of winding 48. Last pin 38 of winding 48 thus represents a fourth end pin.

Fourth end pin 38 additionally has an output 83 for connecting to an energy source. The input and output may naturally also be reversed.

Figure 5:
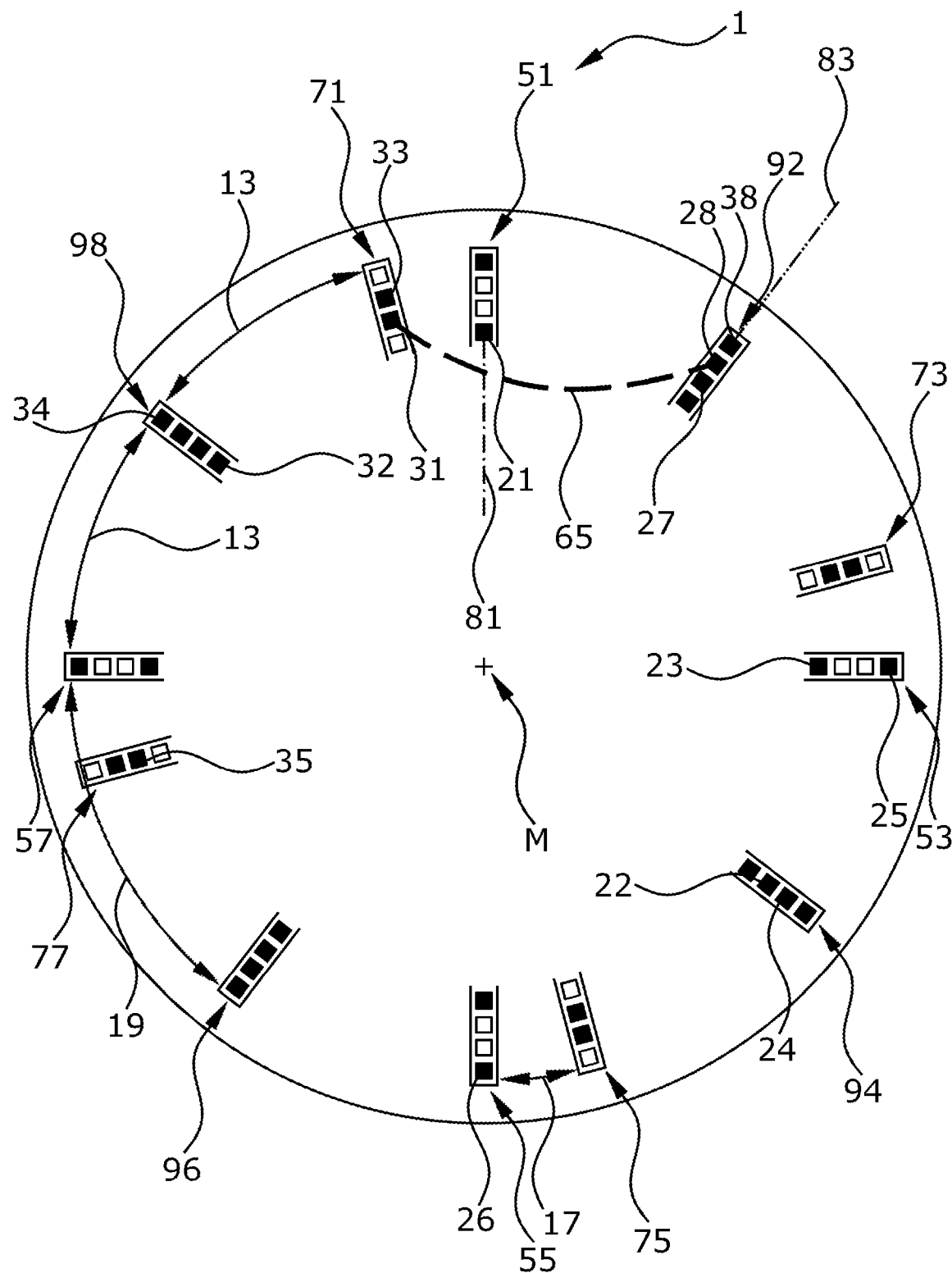
FIG. 5 shows a stator with a first and a second partial coil and their connection to one another and thus a first coil.

FIG. 5 shows a pin assignment by the first and second partial coils from FIGS. 3 and 4, which are represented by black squares. Identical reference numerals designate identical pins, slots, connections in the figures. Second end pin 28 of fourth winding 44 of the first partial coil in slot 92, layer L2 and third end pin 31 of first winding 45 of the second partial coil in slot 71, layer L3 are connected by a fifth connection type 65. This connection forms fourth winding 44, which is mentioned in the description of FIG. 3. Fifth connection type 65 bridges second distance 19.

The two partial coils thus form a first coil 201 with an input 81 and an output 83 after two radial circuits in different respective directions about the stator. A third distance 17, depicted in the figure, is one slot long.

The pins of coil 201 occupy all layers in four slots 92, 94, 96, 98. These four slots 92, 94, 96, 98 are respectively rotated by 90 degrees and have twice the standard distance, or the sum of first distance 13 and second distance 19.

Figure 6:
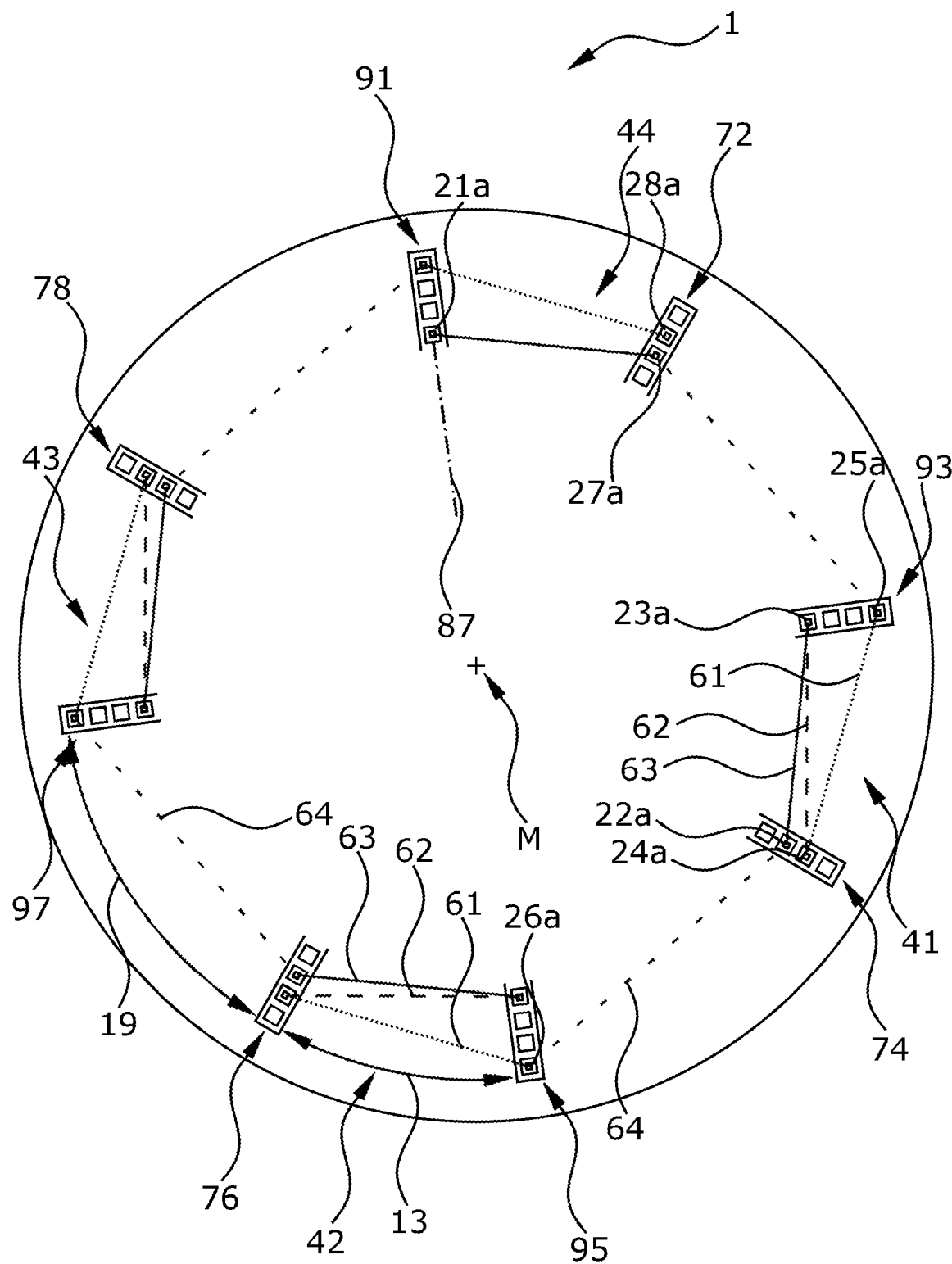
FIG. 6 shows a winding scheme of another partial coil.

FIG. 6 shows a stator 1. The pins are, moreover, arranged on concentric circles, thus layers, wherein the concentric circles are not marked for the sake of a better depiction. It depicts which pins, depicted as black squares on a white background, are serially connected to one another and form a first partial coil of a second coil 202. A fifth end pin 21a is located in slot 91 in layer L4. This fifth end pin 21a is connected to a pin 27a in a slot 72 by means of a third connection type 63, depicted as a solid line. Pin 27a is located in layer L3. Pin 26a is connected to a first pin 25a in layer L1 in a first slot 93 by means of fourth connection type 64, depicted as a short dashed line.

First pin 25a is connected to a second pin 24a via a first connection type 61, depicted as a dotted line. Second pin 24a lies in a second slot 74. A first distance 13, which is one slot shorter than standard distance 11 from FIG. 2, lies between first slot 93 and second slot 74. Second pin 24a lies in layer L2.

Second pin 24a is connected to a third pin 23a in first slot 93 by means of a second connection type 62, depicted as a dashed line. Third pin 23a lies in layer L4. There is thus still space in first slot 93 for two other pins between first pin 25a and third pin 23a.

Third pin 23a is connected to a fourth pin 22a in second slot 74 by means of a third connection type 63, depicted as a solid line. Fourth pin 22a lies in layer L3. Second pin 24a and fourth pin 22a lie in the center of second slot 74, so that there is still space for two other pins on stator inner layer L4 and on stator outer layer L1.

The connection of the first, second, third, and fourth pins forms a first winding 41.

Fourth pin 22a is connected to a fifth pin 26a in a third slot 95 via fourth connection type 64. A second distance 19, which is one slot longer than standard distance 11, lies between second slot 74 and third slot 95. Fifth pin 26a lies in layer L1. At fifth pin 26a, the previously-described serial connection of the consecutive pins in the stator begins again, wherein fifth pin 26a is similar to first pin 25a with an offset of the slot by 90 degrees.

The serial connection of fifth pin 26a to other pins in another slot 76 forms a second winding 42. First, second, and third connection types 61, 62, 63 between these pins is identical to respective first, second, third connection types 61, 62, 63 of the pins of first winding 41.

The two windings 41, 42 are connected by fourth connection type 64. Due to the continuation of the serial connection, a third winding 43 is formed in two other slots 97 and 78. Windings 41, 42, 43 are each connected using fourth connection type 64. Fourth connection type 64 between the respective windings is thus identical. First, second, and third connection types 61, 62, 63 between the pins of windings 43 are also identical to first, second, and third connection types 61, 62, 63 of first and second windings 41, 42.

Fourth winding 44 is also connected to third winding 43 via fourth connection type 64; however, this winding lacks a connection of the second connection type. Pin 28a represents a sixth end pin and winding 44 arises according to FIG. 8 and is described there.

Four windings 41, 42, 43, 44 form a first partial coil by way of one circuit clockwise about stator 1. Fifth end pin 21a has an input 87 for connecting to an energy source. The partial coil ends with sixth end pin 28a of winding 44.

Figure 7:
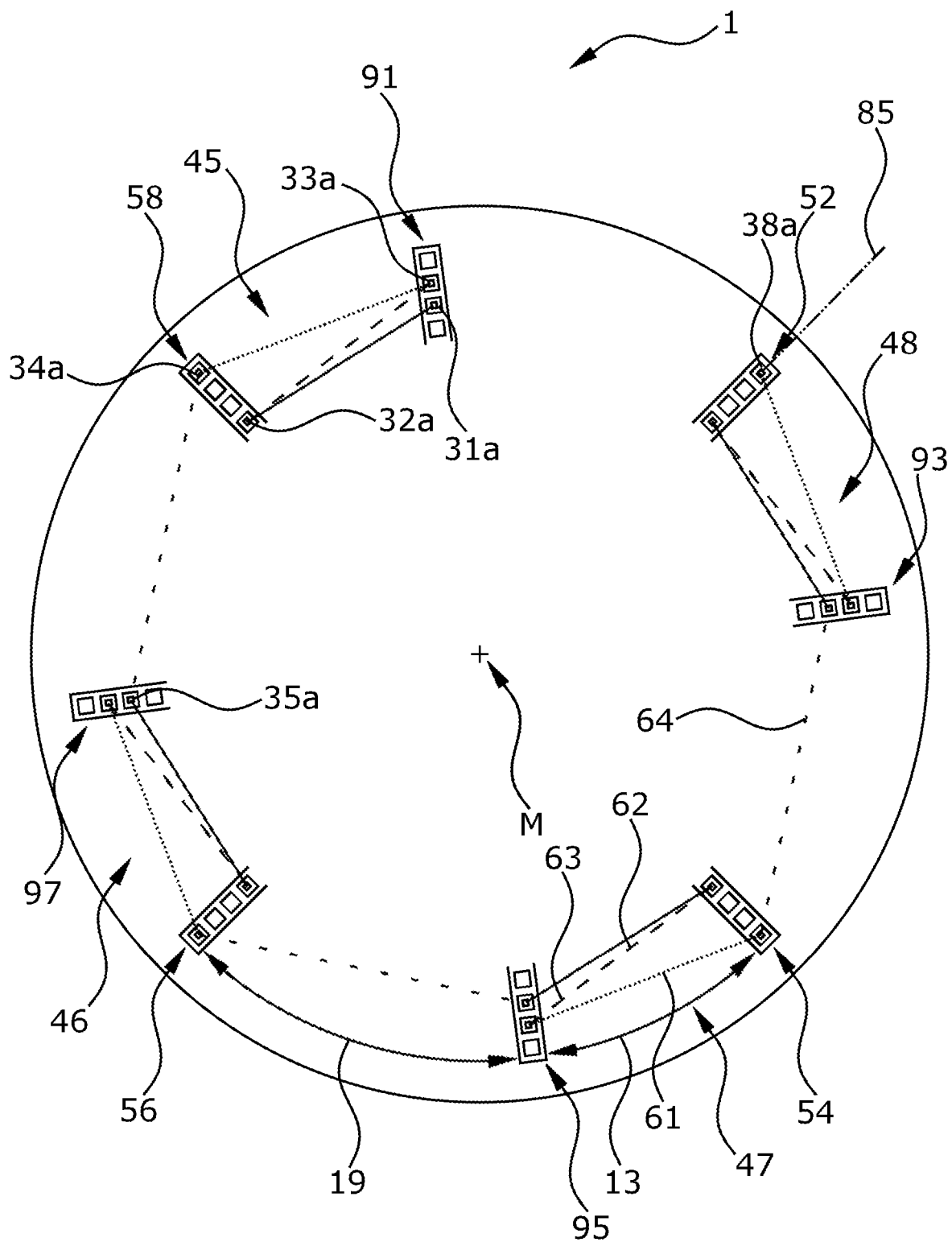
FIG. 7 shows a winding scheme of another partial coil.

FIG. 7 shows a stator 1, wherein eight slots 52, 54, 56, 58, 91, 93, 95, 97 are shown.

The pins are, moreover, arranged on concentric circles, thus layers, wherein the concentric circles are not marked for the sake of a better depiction. It depicts which pins, depicted as black squares on a white background, are serially connected to one another and form a second partial coil of a second coil 202.

Pins 31a, 32a, 33a, 34a, 35a, 38a are connected in the same way as pins 22a, 23a, 24a, 25a, 26a, 28a of FIG. 6. Even the connection types are identical with FIG. 6 and are clearly expressed by identical reference numerals. Windings 45, 46, 47, 48 are formed in the same way as is described in FIG. 6, and connected to one another by fourth connection type 64.

Four windings 45, 46, 47, 48 form a second partial coil by way of one circuit counterclockwise about stator 1. The partial coil begins with a pin 31a, which is a seventh end pin. The partial coil ends with pin 38a of winding 48. Last pin 38a of winding 48 thus represents an eighth end pin.

Eighth end pin 38a additionally has an output 85 for connecting to an energy source. The input and output may also naturally be reversed.

Figure 8:
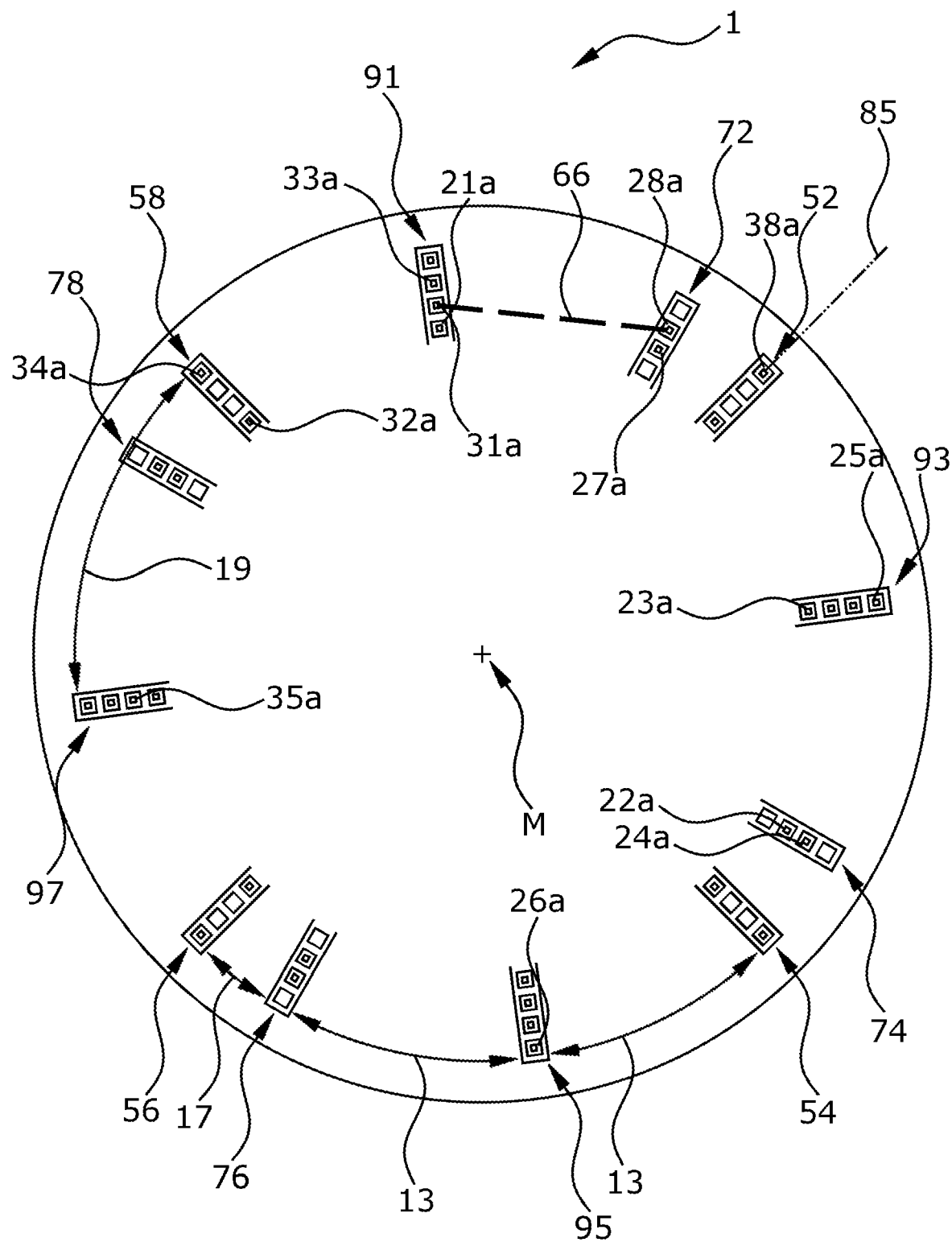
FIG. 8 shows a stator with two other partial coils and their connection to one another and thus a second coil.

FIG. 8 shows a pin assignment by the first and second partial coils from FIGS. 6 and 7, which are depicted by black squares on a white background. Identical reference numerals designate identical pins, slots, and connections in the figures.

Sixth end pin 28a of fourth winding 44 of the first partial coil in slot 72, layer L2 and seventh end pin 31a of first winding 45 of the second partial coil in slot 91, layer L3 are connected using a sixth connection type 66. This connection forms fourth winding 44, which is mentioned in the description of FIG. 6. Sixth connection type 66 bridges first distance 13.

The two partial coils thus form a second coil 202 with an input 87 and an output 85 after two radial circuits in different respective directions about the stator. A third distance 17 depicted in the figure is one slot long.

The pins of coil 202 occupy all layers in four slots 91, 93, 95, 97. These four slots are respectively rotated by 90 degrees and have twice the standard distance, or the sum of first distance 13 and second distance 19.

Figure 9:
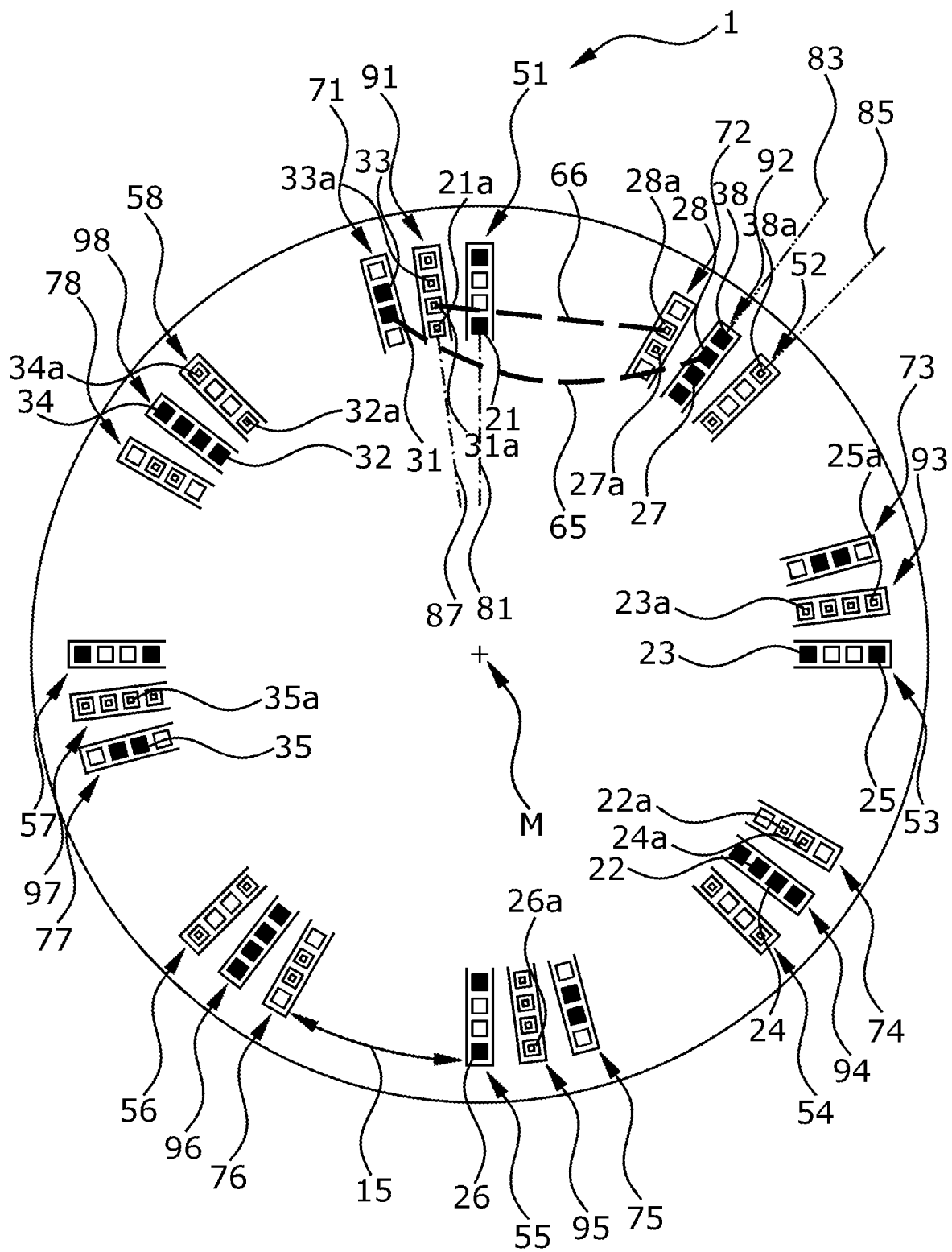
FIG. 9 shows a stator with two coils consisting of two partial coils respectively.

FIG. 9 shows a pin assignment by first coil 201 from FIG. 5, which is depicted by black squares. Identical reference numerals designate identical pins, slots, and connections in the figures. Furthermore, the second coil from FIG. 8 is depicted as black squares on a white background. The partial coils of the two coils are connected by fifth connection type 65 (first coil) or sixth connection type 66 (second coil). Fifth connection type 65 bridges second distance 19. Sixth connection type 66 bridges first distance 13. The pins of the two coils lie in each case in three adjacent coils. A third distance 15, which is two slots shorter than standard distance 11, is located between the respective outer slots of the three adjacent slots.

Thus, two parallel coils are shown, which each consist of two partial coils. Inputs and outputs of the coils are likewise shown. Input 81 of the first coil is located at slot 51 and output 83 at slot 92. Input 87 of the second coil is located at slot 91 and output 85 at slot 52. The inputs and outputs of both coils thus lie in adjacent slots.

Figure 10:
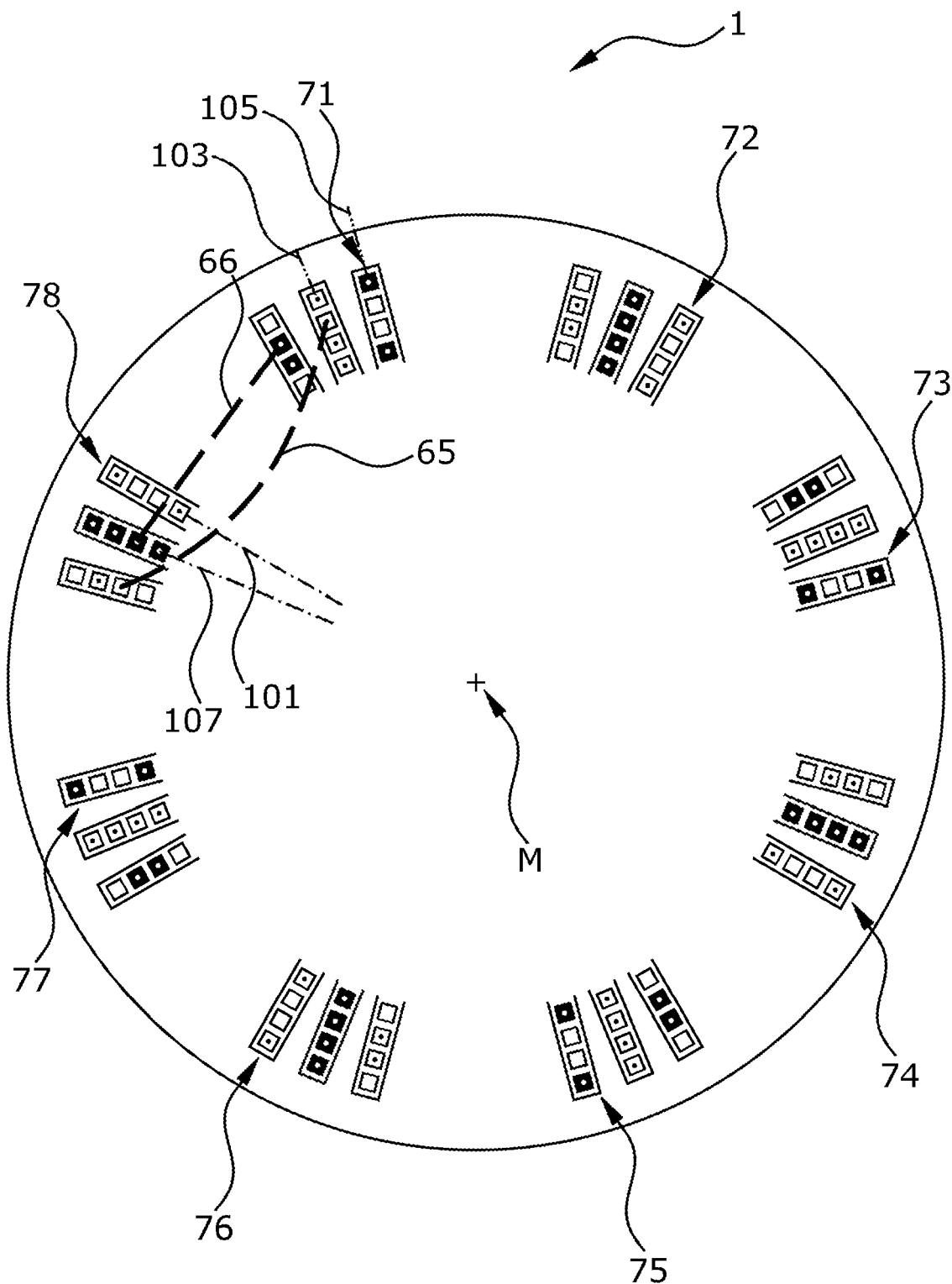
FIG. 10 shows a stator with two other coils.

FIG. 10 shows a pin assignment by a third and fourth coil in the black squares with white dots and the white squares with black dots. This results from a winding scheme, known from FIGS. 3, 4, 5, 6, 7, 8, which is offset counter-clockwise by eight slots in each case in comparison to the pins and connections of the partial coils shown there. Input 101 and output 103 of the third coil and input 107 and output 105 of the fourth coil are likewise shown. The inputs and outputs of both coils thus lie in adjacent slots.

Figure 11:
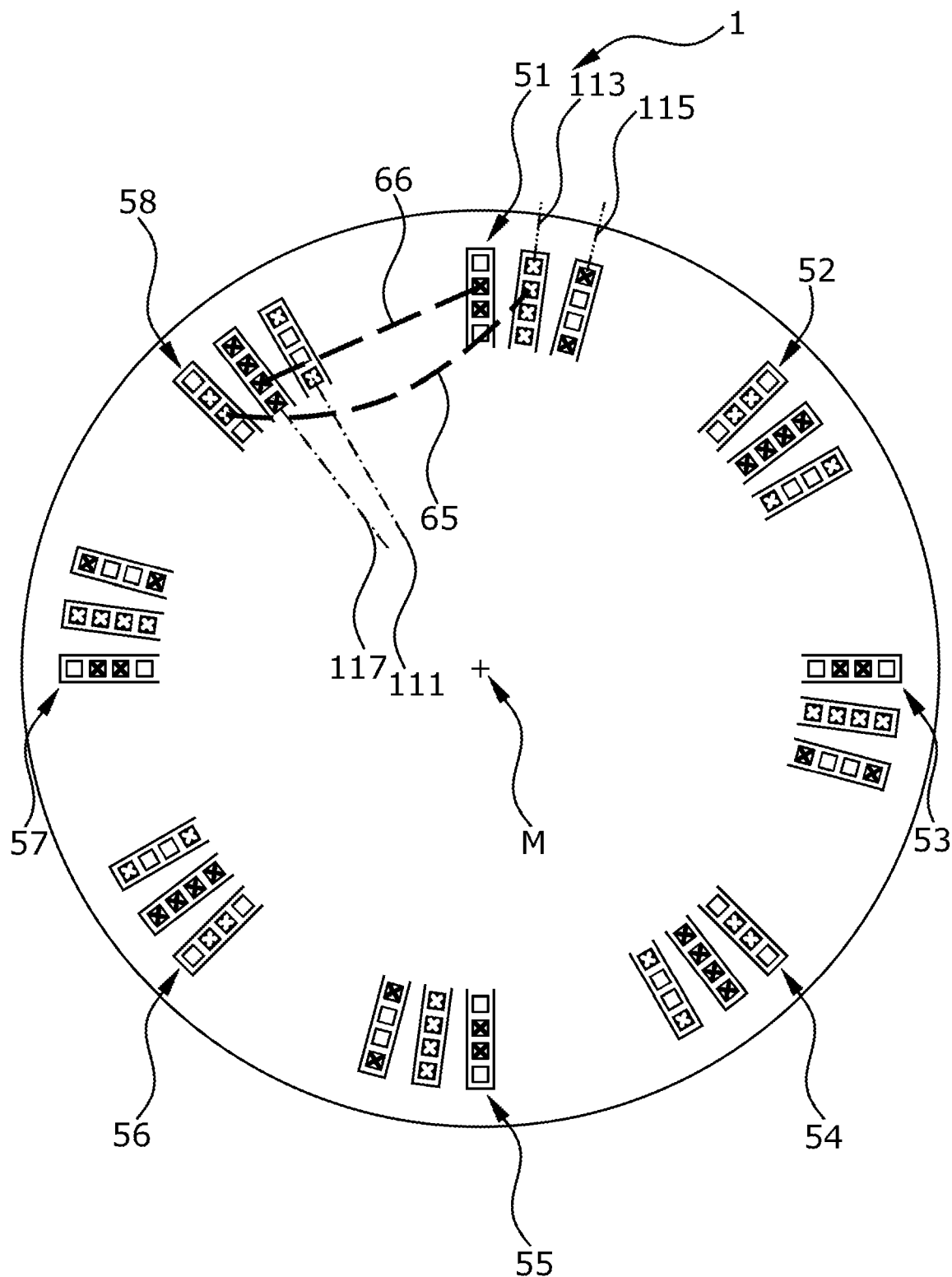
FIG. 11 shows a stator with two other coils.

FIG. 11 shows a pin assignment by a fifth and sixth coil in the black squares with white crosses and the white squares with black crosses. This results from a winding scheme, known from FIGS. 3, 4, 5, 6, 7, 8, which is offset counter-clockwise by four slots in comparison to the pins and connections of the partial coils shown there. Input 111 and output 113 of the fifth coil and input 117 and output 115 of the sixth coil are likewise shown. The inputs and outputs of both coils thus lie in the respectively identical slot.

Figure 12:
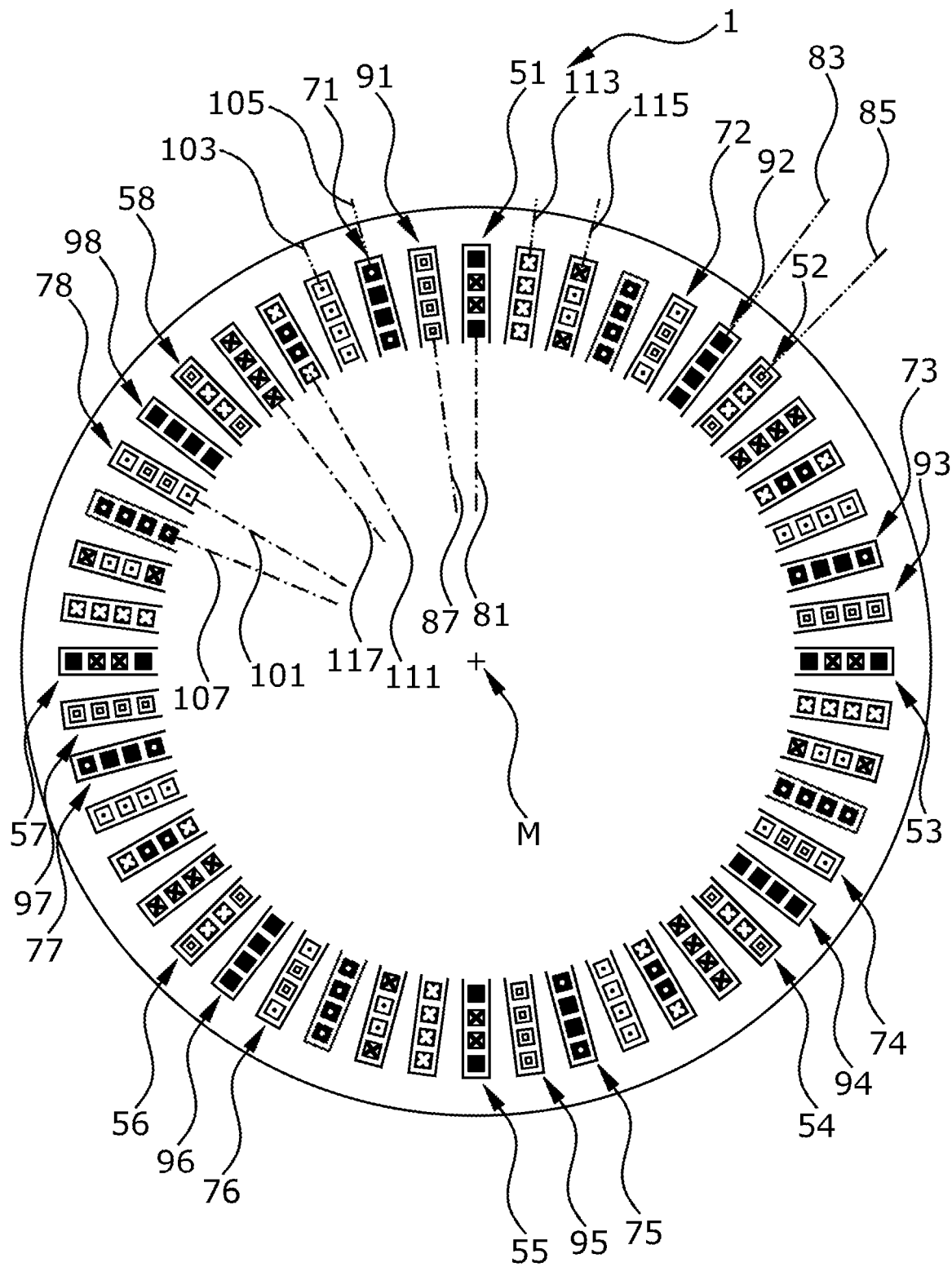
FIG. 12 shows a stator with six coils.

FIG. 12 shows a pin assignment by the six coils as a combination from FIGS. 9, 10, and 11. In particular, it is clear from the location of inputs 81, 87, 101, 107, 111, 117 and outputs 83, 85, 103, 105, 113, 115 that an interconnection of the coils may be carried out within 16 slots. In the stator with forty eight slots, depicted by way of example, an interconnection of the inputs and outputs is thus possible within one third of the stator circumference. Purely with reference to the inputs or outputs, a separate switching would be possible within ten slots.

Figure 13:
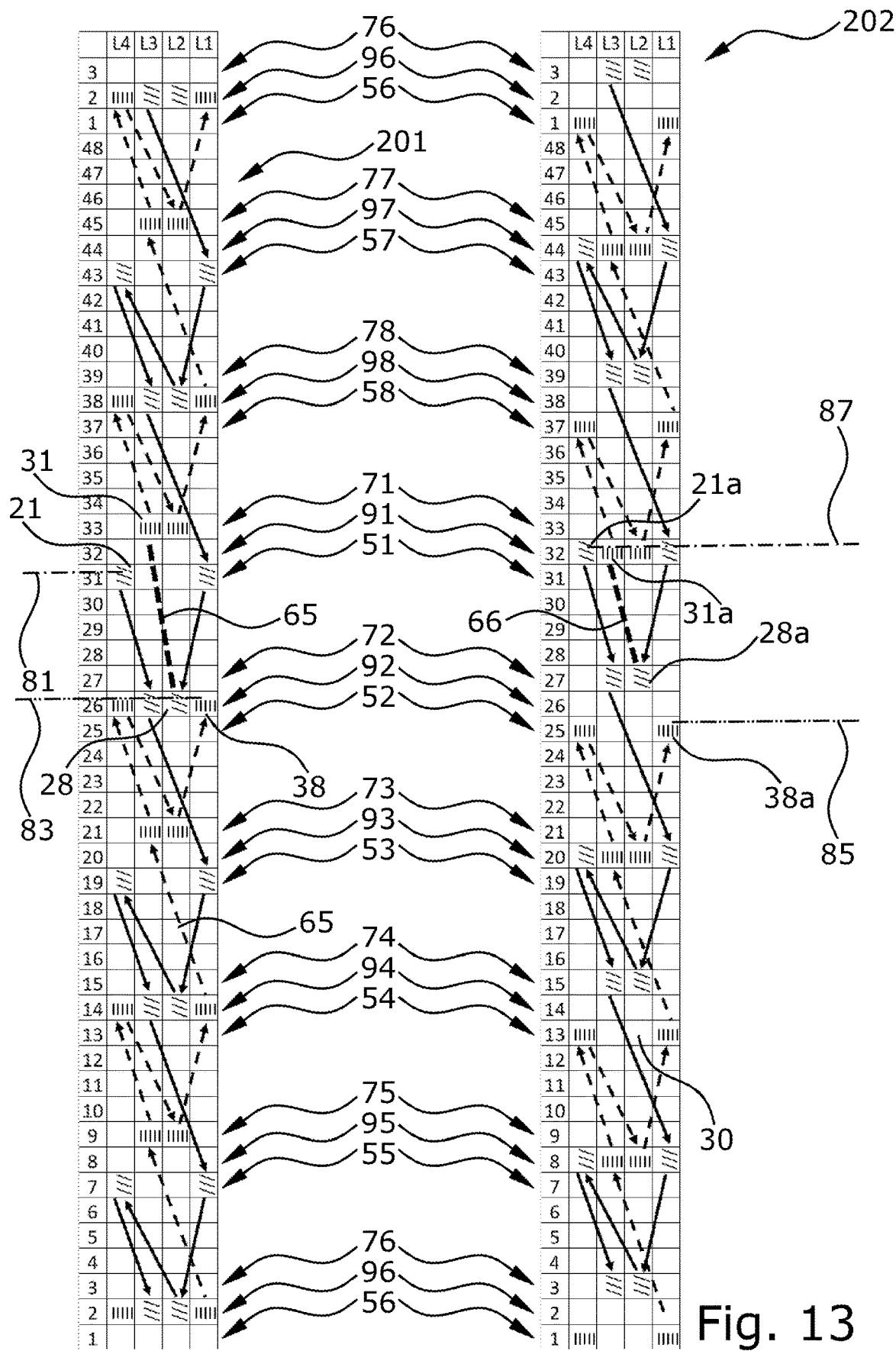
FIG. 13 shows a winding scheme of a first and second coil.

FIG. 13 shows the winding scheme of two partial coils of first coil 201 and second coil 202. The consecutive "slot number" is not a reference numeral. The reference numerals with arrows to the slots are identical to the preceding figures and enable a comparison with these figures.

Figure 14:
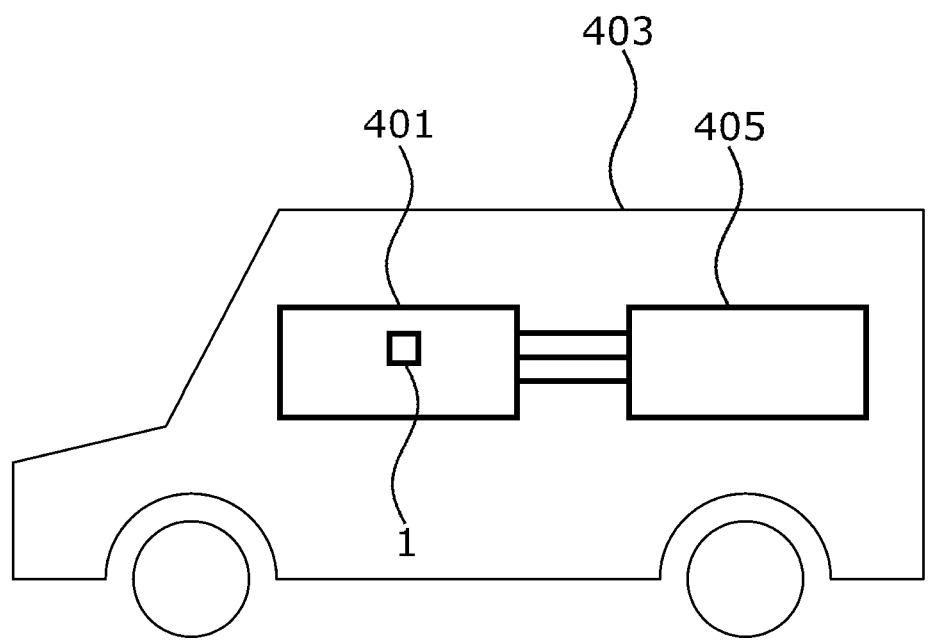
FIG. 14 shows a vehicle with an electric machine, in particular an electric motor with a stator with an inverter.

FIG. 14 is a basic sketch of an exemplary embodiment of a vehicle 403, for example, a hybrid vehicle or an electric vehicle, comprising an electric machine 401, in particular an electric motor, with an exemplary embodiment of stator 1 for driving vehicle 403. Furthermore, vehicle 403 may have an inverter 405, which supplies electric machine 401 with an alternating current from a direct current source.

LIST OF REFERENCE NUMERALS

1 Stator
2, 3 Pin
7 First end face
9 Second end face
11 Standard distance
13 First distance
17 Third distance
19 Second distance
21 First end pin
28 Second end pin
31 Third end pin
38 Fourth end pin
21a Fifth end pin
28a Sixth end pin
31a Seventh end pin
38a Eighth end pin
22-27, 22a-27a Pins
32-37, 32a-37a Pins
41-48 Winding
51-58 Slots
61 First connection type
62 Second connection type
63 Third connection type
64 Fourth connection type
65 Fifth connection type
66 Sixth connection type
71-78 Slots
81, 87, 101, 107, 111, 117 Input
83, 85, 103, 105, 113, 115 Output
91-98 Slots
201 First coil
202 Second coil
401 Electric machine
403 Vehicle
405 Inverter
L1, L2, L3, L4 Layer
M Stator center

The invention claimed is:

1. A stator (1) for an electric machine (100) comprising:
a plurality of pins (22, 23, 24, 25), which are arranged on concentric circles at different distances to a stator center (M) in slots (51-58, 71-78, 91-98) in the stator (1), and each concentric circle forms a layer (L1, L2, L3, L4),
wherein in each case four pins (22, 23, 24, 25) in different layers (L1, L2, L3, L4) are serially connected to one another and form a winding (41),
a first pin (25) of the winding (41) is located in a first slot (53) in the 4n-3 layer (L1), wherein n is an integer,
a second pin (24) of the winding (41) is located in a second slot (94) in the 4n-2 layer (L2), wherein the second slot (94) has a first radial distance (13) to the first slot (53) in a first circumferential direction of the stator (1),
a third pin (23) of the winding (41) is located in the first slot (53) in the 4n layer (L4),
a fourth pin (22) of the winding (41) is located in the second slot (94) in the 4n-1 layer (L3).

2. The stator (1) according to claim 1, wherein the stator (1) has a first end face (7) and a second end face (9); and
the first pin (25) and the second pin (24) are connected to one another on the second end face (9) by means of a first connection type (61);
the second pin (24) and the third pin (23) are connected to one another on the first end face (7) by means of a second connection type (62);
the third pin (23) and the fourth pin (22) are connected to one another on the second end face (9) by means of a third connection type (63);
wherein the first, second, and third connection types differ from one another.

3. The stator (1) according to claim 1, wherein the stator (1) has at least two windings (41, 42, 43) and at least the fourth pin (22) in the second slot (94) is connected to a fifth pin (26) in the 4n-3 layer (L3) in a fifth slot (55) by means of a fourth connection type (64).

4. Stator (1) according to claim 3, wherein a a second distance (19) that is greater than the first radial distance (13), wherein the second distance lies between second slot (94) and third slot (55).

5. The stator (1) according to claim 3, wherein the stator (1) has a plurality of windings (41, 42), which extend across the entire circumference of the stator (1) and thereby form a partial coil.

6. The stator (1) according to claim 5, wherein one pin (28, 28a, 31, 31a) in each case from two partial coils are connected to one another by means of a fifth connection type (65) or a sixth connection type (66) and form a coil (201, 202).

7. The stator (1) according to claim 6, wherein four pins of a coil completely occupy four slots (92, 94, 96, 98).

8. The stator (1) according to claim 7, wherein the partial coils form six coils, and these are assigned to three phases in such a way that in each case two coils, which are assigned to a same phase, are located in three adjacent slots (51-58, 71-78, 91-98) and thereby in each case two different layers of the two outer slots (71-78, 91-98) are occupied by pins from other phases.

9. The stator (1) according to claim 8, wherein in each case one output (81, 87, 101, 107, 111, 117) and one output (83, 103, 113, 85, 105, 115) of the at least two coils (201, 202) are connected to one another, and the two coils (201, 202) are thus switched in parallel, and, in particular, are assigned to one phase.

10. A vehicle (403) with an electric machine (401) with a stator (1) according to claim 1.

* * * * *